United States Patent
Bourdillat et al.

(12)

(10) Patent No.: US 6,560,715 B1
(45) Date of Patent: May 6, 2003

(54) SEQUENCER OF SYNCHRONOUS ACTIONS IN A PROCESSOR SYSTEM, AND INTEGRATED CIRCUIT INCLUDING SUCH SEQUENCER

(75) Inventors: Jean-Pierre Bourdillat, Le Plessis Robinson (FR); Michel Richy, Elancourt (FR)

(73) Assignee: EADS Defence and Security Networks, Montigny-le-Bretonneux (FR)

( * ) Notice: Subject to any disclaimer, the term of this patent is extended or adjusted under 35 U.S.C. 154(b) by 0 days.

(21) Appl. No.: 09/432,972

(22) Filed: Nov. 3, 1999

(30) Foreign Application Priority Data

Nov. 4, 1998  (FR) .............................. 98 13854

(51) Int. Cl.⁷ ................................................ G06F 1/04
(52) U.S. Cl. ...................... 713/400; 713/400; 713/502
(58) Field of Search ............................ 713/400, 1, 500, 713/502, 600

(56) References Cited

U.S. PATENT DOCUMENTS

| | | | |
|---|---|---|---|
| 5,542,061 A | | 7/1996 | Omata |
| 5,694,542 A | * | 12/1997 | Kopetz ........................ 714/47 |
| 6,317,593 B1 | * | 11/2001 | Vossler ...................... 455/414 |

FOREIGN PATENT DOCUMENTS

| | | | |
|---|---|---|---|
| EP | 0 578 361 | 1/1994 | |
| JP | 02285421 | * 11/1990 | ............. G06F/9/22 |
| WO | WO 98/22872 | 5/1998 | |

OTHER PUBLICATIONS

Kwak S H, et al., "A 32–Bit Low Power RISC Core For Embedded Applications", 1995 IEEE Tencon. IEEE Region Ten International Conference On Microelectronics and VLSI, Hong–Kong, Nov. 6–10, 1995, pp. 488–491.

\* cited by examiner

*Primary Examiner*—Thomas Lee
*Assistant Examiner*—Yasin Barqadle
(74) *Attorney, Agent, or Firm*—McCracken & Frank

(57) ABSTRACT

For triggering actions synchronous with a system clock in an electronic system comprising a management processor, a program memory and peripheral units, the sequencer comprises: an instruction register including a date field for containing an instruction execution date, an instruction code field and a data field, means for loading the instruction register from the program memory via a DMA channel, a comparator receiving a current date obtained from the system clock and the execution date contained in the date field of the instruction register, and a control logic unit for decoding the contents of the instruction code and data fields of the instruction register and triggering actions deduced from such decoding at the time the comparator shows that the current date has reached the execution date in the peripheral units and without intervention by the management processor.

11 Claims, 2 Drawing Sheets

SEQUENCER OF SYNCHRONOUS ACTIONS IN A PROCESSOR SYSTEM, AND INTEGRATED CIRCUIT INCLUDING SUCH SEQUENCER

BACKGROUND OF THE INVENTION

The invention relates to processor-controlled electronic systems requiring a number of synchronous actions based on a system clock.

When such actions must be triggered at a very high rate or at very precise times, the response times of the processors can become incompatible.

The invention finds one particular application in digital mobile radio terminals. The processor has to manage a number of tasks with weak real time constraints, for example tasks which concern the user interface. Other functions of the terminal require rapid action triggered at very precise times, for example functions which concern signal processing and control of the radio interface.

In this kind of application, one option is to use a hardware timebase which periodically signals to the processor the triggering times of dated actions. The processor is then invoked frequently, which reduces its performance in terms of power consumption and computing power.

This also complicates software management and development.

Another option is to use two processors, namely a standard microprocessor/microcontroller for management purposes, which is essentially responsible for slow asynchronous events (keyboard-display management, system interface, etc) and a signal processor coupled to a timebase for managing synchronous or dated events.

One object of the present invention is to propose a new architecture which simplifies the management of synchronous events in a system of the above kind.

SUMMARY OF THE INVENTION

The invention thus proposes a sequencer for triggering actions synchronous with a system clock in an electronic system comprising a management processor, a program memory and peripheral units. The sequencer comprises: an instruction register including a date field for containing an instruction execution date, an instruction code field and a data field, means for loading the instruction register from the program memory via a DMA channel, a comparator receiving a current date obtained from the system clock and the execution date contained in the date field of the instruction register, and a control logic unit for decoding the contents of the instruction code and data fields of the instruction register and triggering actions in the peripheral units as deduced from such decoding at the time the comparator shows that the current date has reached the execution date, without intervention by the management processor.

Synchronous actions with a strong real time constraint are the responsibility of the sequencer, which frees the processor from actions which are heavy consumers of CPU time so that it can devote itself to higher level tasks or go to a standby mode to save power. This facilitates the use of multitask management software or real time OS (operating system) software by reducing the rate of interrupts. The sequencer then serves as a "hardware real time OS".

The sequencer also simplifies management of the system standby mode. Associated with a synchronous, and synchronizable, timebase, it performs actions which are synchronized at the system level.

The sharing of peripheral resources by the processor and the sequencer makes specifying, implementing, testing and using peripherals associated with the sequencer and the processor flexible.

The sequencer preferably includes a command register which is accessible to the management processor and which contains commands for initializing operation of the sequencer. After initialization, the sequencer program is executed incrementally. The command register can also contain information on the status of the sequencer.

The means for loading the instruction register advantageously comprise a base address register which can be written by the processor, an incremental address counter driven by the control logic unit, a summing unit receiving the base address and the incremental address, and a DMA controller for loading the instruction register with a dated instruction read in the program memory at an address supplied by the summing unit.

Various programs can therefore be established in advance, calls to those programs being specified by the processor supplying the base address.

Another aspect of the present invention relates to an integrated circuit comprising a management processor, a program memory, peripheral units, means for obtaining a system clock and a sequencer as defined hereinabove for triggering actions synchronous with the system clock in the peripheral units.

An integrated circuit of the above kind has been implemented in silicon for a mobile radio application and the increase in the area of the circuit due to the presence of the sequencer of the invention was found to be small (less than 2%).

DESCRIPTION OF PREFERRED EMBODIMENTS

Figure 1:
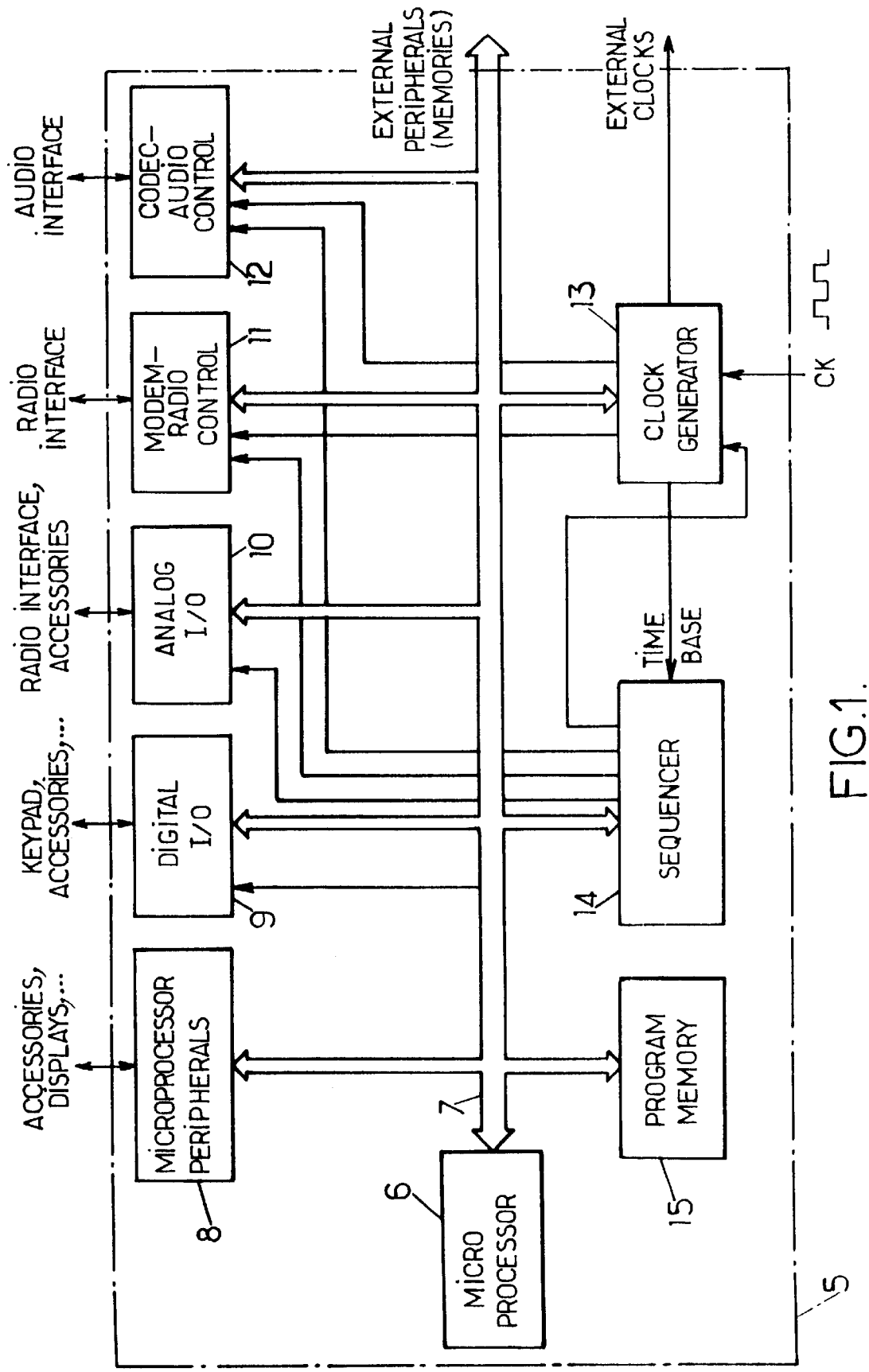
FIG. 1 is a block diagram of the digital part of a mobile radio terminal implementing the present invention.

Referring to FIG. 1, the logic part of a digital mobile radio terminal is organized around an application specific integrated circuit (ASIC). The integrated circuit 5 is a CMOS circuit, for example. In the example shown in FIG. 1, it combines various logic functions of the terminal. The circuit 5 may also provide some analog functions.

The integrated circuit 5 includes a processor core 6 whose bus 7 is connected to a number of units 8–15 implemented in the integrated circuit 5.

Those units include peripheral units 8–12 which, in the example shown, include:

- microprocessor peripherals 8 for serial communication with accessories, displays, etc,
- digital inputs/outputs 9 for controlling the man-machine interface (keypad, displays, simple accessories, etc),
- analog input/outputs 10 for measurements or applying analog levels to signals exchanged with the radio or the accessories,
- a radio unit 11 including the modem of the terminal and various radio interface control functions, and
- an audio unit 12 including the audio codec and various audio interface control functions.

Some peripherals can be external to the integrated circuit 5 (external memories, signal coprocessor cooperating with the radio and audio units 11, 12, etc). These external peripherals are connected to the microprocessor bus accessible from outside the circuit.

The programs to be executed by the sequencer 14 are stored in internal RAM program memory (unit 15) or in external memory.

The clock generator unit 13 receives a clock signal CK from the hardware clock of the terminal (for example a 13 MHz signal) and constructs a number of clock signals for timing the various units of the integrated circuit 5, including the timebase for the sequencer, and units external to the integrated circuit.

Figure 2:
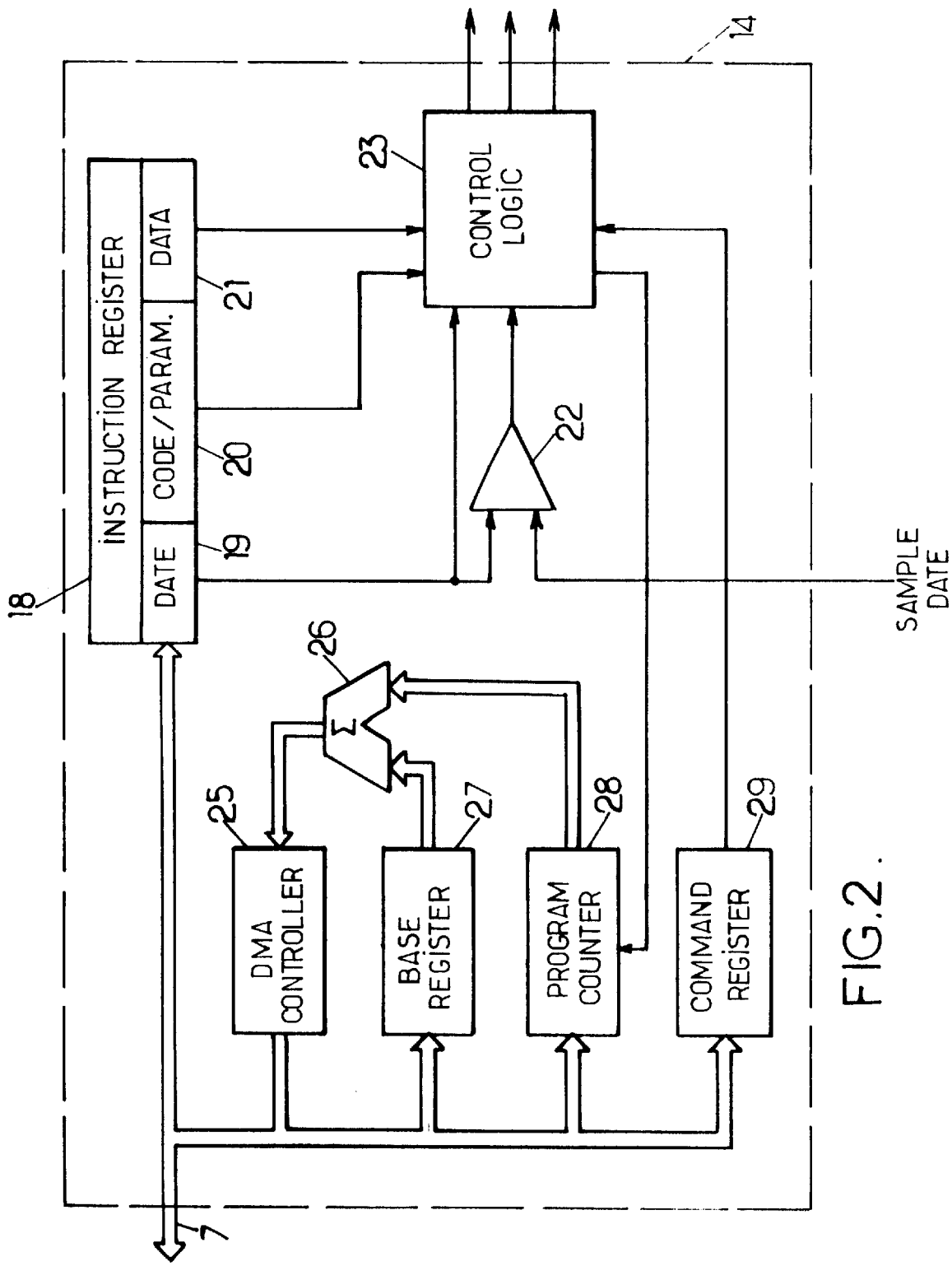
FIG. 2 is a block diagram of a sequencer in accordance with the invention.

FIG. 2 shows the structure of the sequencer 14. The instruction register 18 connected to the bus 7 has three fields: a date field 19 containing an instruction execution date, an instruction code field 20 containing a code identifying the instruction to be executed, and possibly parameters of that instruction, and a data field 21 containing data needed to execute the instruction.

A comparator 22 receives the content of the date field 19 of the instruction register 18 and a sample date supplied by the clock generator unit 13.

The unit 13 defines the reference clocks of the system, for example on the basis of the 16 kHz system clock derived from the 13 MHz signal from the hardware clock. Consider the situation in which the radio signal is formed with digital samples at 16 kHz grouped into 20 ms frames in turn grouped into 4 s superframes. The 16 kHz clock feeds a frame sample counter FSC, and the latter feeds a frame counter FC. In the case considered here, the samples in each frame are counted modulo 320 and the frames are counted modulo 200 (these two values can be programmed by the processor 6). With the above values, counting samples in each frame requires nine bits and counting frames requires eight bits. The sample date supplied to the comparator 22 by the clock generator unit 13 is formed by concatenating the two counters FC and FSC, and is compared to the content of field 19 of the instruction register.

The bus 7 being 32 bits wide, for example, the instruction register 18 can have 17 bits in the date field 19, seven bits (4 code bits and 3 parameter bits) in the instruction code field 20 and eight bits in the data field 21.

If the two dates compared by the comparator 22 are the same, control logic 23 of the sequencer triggers the action coded in the code field 20 of the instruction register by taking into consideration, where applicable, data included in the field 21. The action identified by this decoding is then executed in the peripheral unit concerned.

The sequencer 14 includes a direct memory access (DMA) controller 25 for loading instructions into the register 18. The controller 25 controls access to the program memory 15 on a DMA channel. The processor 6 is caused to wait and the bus 7 is released to enable the instruction register of the sequencer to be loaded in a few cycles. The program memory is accessed at an instruction address delivered by a summing unit 26 which receives a base address supplied by a base address register 27 and an incremental address supplied by a program counter 28.

The register 27 and the counter 28 can be written by the microprocessor 6 via the bus 7. When the sequencer 14 is initialized, the processor 6 writes a base address in the register 27 and an initial incremental address in the counter 28. The base address in the register 27 then remains uncharged (until the sequencer is initialized again) and the program counter 28 is incremented by the control logic 23 when it performs the action identified by decoding field 20 of the instruction register. Accordingly, when the comparator 22 and the control logic 23 finish processing an instruction, the program counter 28 is incremented and the DMA controller 25 looks for the next instruction in the program memory 15 in order to load it Into the instruction register 18. If it has the same date as the instruction that has just been executed, the next instruction is executed immediately. This is to enable execution of a plurality of actions from the same date.

The sequencer 14 further includes a command register 29 which can be read and written by the processor 6 via the bus 7 and which contains parameters for initializing the control logic 23 and sequencer status parameters supplied by the logic unit 23. The processor 6 uses the command register 29 to drive the sequencer and to determine its status.

The register 29 can comprise seven bits, for example, namely three bits for initializing the control logic 23 (one bit indicating if the system clock is supplied to the sequencer 14, one bit authorizing the sequencer to address the Interrupt processor in the event of an error in the dates or in the decoding of the instructions, and one bit authorizing operation of the sequencer 14 without regard to the frame date FC, in which case the comparator 22 takes account of only the frame sample counter FSC), and four bits indicating the status of the sequencer (one bit indicating that a long action of the sequencer is being executed, one bit indicating the coincidence of the dates and the zero crossing of the sample date, an alarm bit associated with the comparison of dates and an alarm bit associated with an unknown instruction).

For example, the control logic 23 can be configured to drive eleven types of action as a function of the instruction code on four bits, as shown in Table I.

The output ports affected by the CLEARBITPORT, SETBITPORT and PULSEBITPORT actions are digital inputs/outputs of the integrated circuit forming part of the unit 9. These ports are also accessible to the processor 6. If the same output port is simultaneously written by the processor 6 and the sequencer 14, the sequencer takes priority, for example. In the case of incompatible successive programmings, it is the last programming which is taken into account. For the CLEARBITPORT, SETBITPORT and PULSEBITPORT instructions, the port address is defined in the data field 21 of the instruction register. For the SETANAPORT instruction, the analog ports allocated are part of the unit 10 and the port number is defined in the parameter area of the code field 20, the value of the voltage being defined in the data field 21.

Setting bits of a register of peripheral units 9–13 forming part of the integrated circuit 5 consists in writing a 1 or a 0 (instructions SETBITREG and CLEARBITREG). Some of these registers are also accessible to the processor 6 and access conflicts can be resolved by auxiliary control registers in the units 9–13. Decoding the Parameter area of the code field 20 and the data field 21 provides access to up to 128 registers each of 16 bits.

The ITSQ, STOP and JUMP instructions are triggered by the control logic 23 in the sequencer itself.

TABLE I

| Instruction name | Code | Parameters XXX: undefined VVV: value | DESCRIPTION |
|---|---|---|---|
| CLEARBITPORT | 0000 | XXX | Reset an ASIC output port to 0. |
| SETBITPORT | 0001 | XXX | Set an ASIC output port to 1. |
| PULSEBITPORT | 0010 | XXX | Generate a pulse at level |

TABLE I-continued

| Instruction name | Code | Parameters XXX: undefined VVV: value | DESCRIPTION |
| --- | --- | --- | --- |
| | | | opposite current state and of approx. 1 μs duration at an ASIC output port. |
| CLEARBITREG | 0100 | VVV | Set an ASIC register bit to 0. |
| SETBITREG | 0101 | VVV | Set an ASIC register bit to 1. |
| SETANAPORT | 0110 | VVV | Generate an analog voltage at an ASIC analog port. |
| DELAY | 1000 | XXX | Delay between execution of two actions programmed at same date. Delay value, in range from 0 ms to 63 ms is defined in data field 21. |
| RADPRG | 1001 | VVV | Program a radio circuit whose number is given by parameter area of code field 20 and address of data in memory in data field 21. |
| ITSQ | 1011 | XXX | Generate an unconditional interrupt from sequencer to processor 6. |
| STOP | 1100 | XXX | Stop sequencer. Its clock is cut off. |
| JUMP | 1101 | VVV | Load program counter 28 with a RAM address offset supplied in parameter area of code field 20 and data field 21. |

We claim:

1. A sequencer for triggering actions synchronous with a system clock in an electronic system comprising a management processor, a program memory and peripheral units, the sequencer comprising: an instruction register including a date field for containing an instruction execution date, an instruction code field and a data field; means for loading the instruction register from the program memory via a DMA channel; a comparator receiving a current date obtained from the system clock and the execution date contained in the date field of the instruction register; and a control logic unit for decoding the contents of the instruction code and data fields of the instruction register and triggering actions in the peripheral units as deduced from said decoding at the time the comparator shows that the current date has reached the execution date, without intervention by the management processor.

2. A sequencer according to claim 1, further comprising a command register accessible to the management processor, for containing commands for initializing operation of the sequencer.

3. A sequencer according to claim 2, wherein the command register has locations for containing information on a status of the sequencer.

4. A sequencer according to claim 1, wherein the means for loading the instruction register comprise a base address register accessible for writing by the processor, an incremental address counter driven by the control logic unit, a summing unit receiving a base address and an incremental address from said base address register and said incremental address counter, and a DMA controller for loading the instruction register with a dated instruction read in the program memory at an address supplied by the summing unit.

5. An integrated circuit comprising a management processor, a program memory, peripheral units, means for obtaining a system clock and a sequencer for triggering actions synchronous with the system clock in the peripheral units, wherein the sequencer comprises: an instruction register including a date field for containing an instruction execution date, an instruction code field and a data field; means for loading the instruction register from the program memory via a DMA channel; a comparator receiving a current date obtained from the system clock and the execution date contained in the date field of the instruction register; and a control logic unit for decoding the contents of the instruction code and data fields of the instruction register and triggering actions in the peripheral units as deduced from said decoding at the time the comparator shows that the current date has reached the execution date, without intervention by the management processor.

6. An integrated circuit according to claim 5, wherein the sequencer further comprises a command register accessible to the management processor, for containing commands for initializing operation of the sequencer.

7. An integrated circuit according to claim 6, wherein the command register has locations for containing information on a status of the sequencer.

8. An integrated circuit according to claim 5, wherein the means for loading the instruction register comprise a base address register accessible for writing by the processor, an incremental address counter driven by the control logic unit, a summing unit receiving a base address and an incremental address from said base address register and said incremental address counter, and a DMA controller for loading the instruction register with a dated instruction read in the program memory at an address supplied by the summing unit.

9. An integrated circuit according to claim 5, wherein at least some of the actions deduced from the decoding are triggered by the control logic unit in registers of the peripheral units which are also accessible to the management processor.

10. An integrated circuit according to claim 5, wherein at least some actions deduced from the decoding are triggered by the control logic unit in input/output ports of the integrated circuit which are also accessible to the management processor.

11. An integrated circuit according to claim 5, wherein at least some actions deduced from the decoding are triggered by the control logic unit in the sequencer.

* * * * *